May 4, 1937.  W. M. RYAN ET AL  2,079,041
FLUID DISTRIBUTION AND CONTROL
Filed Jan. 31, 1934    5 Sheets-Sheet 1
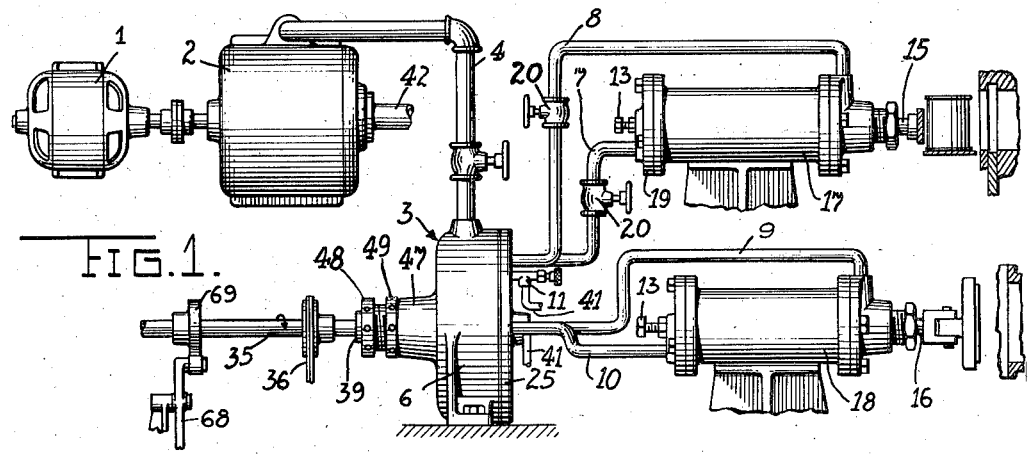
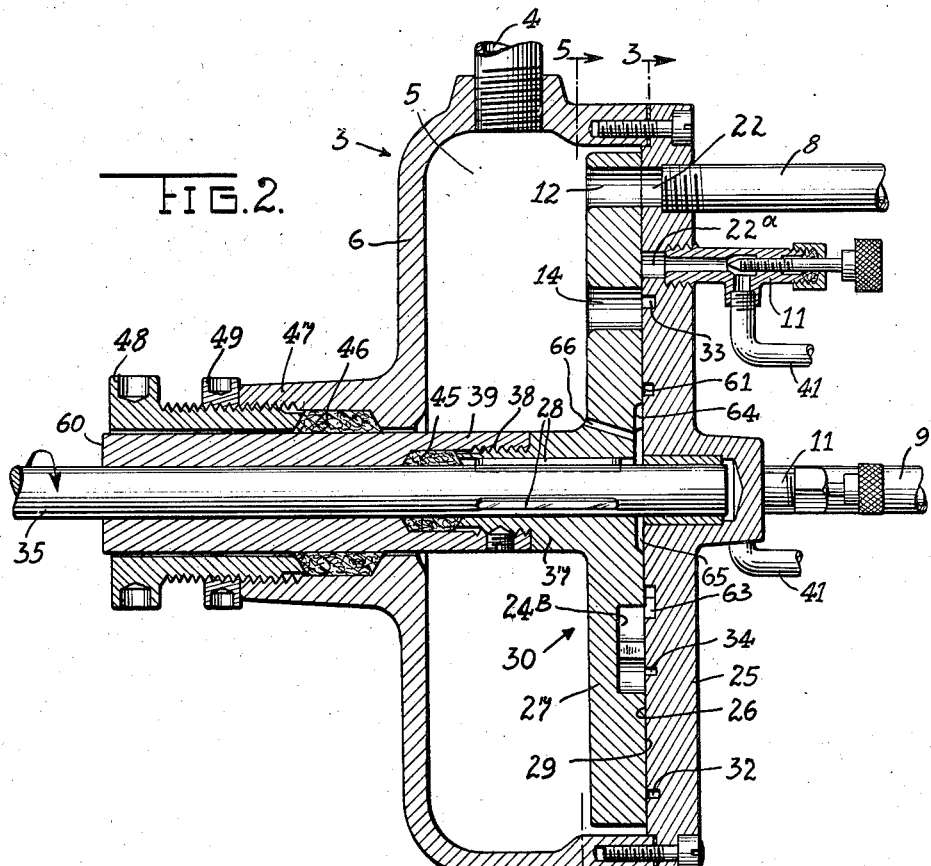
INVENTORS
WILLIAM MILES RYAN
JOHN W. BOLD
BY
THEIR ATTORNEYS

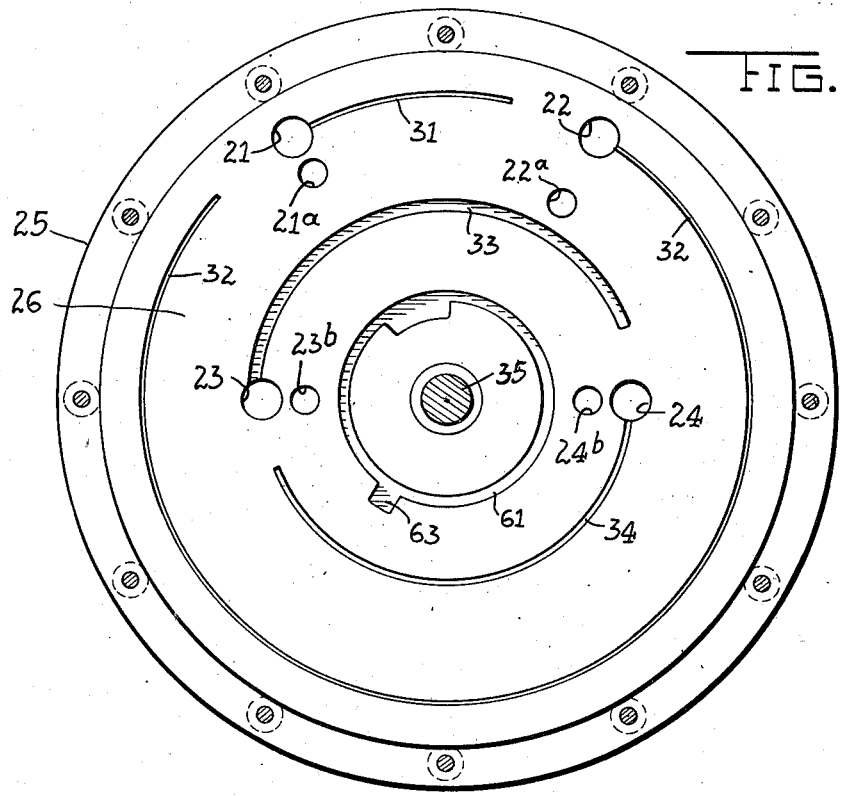
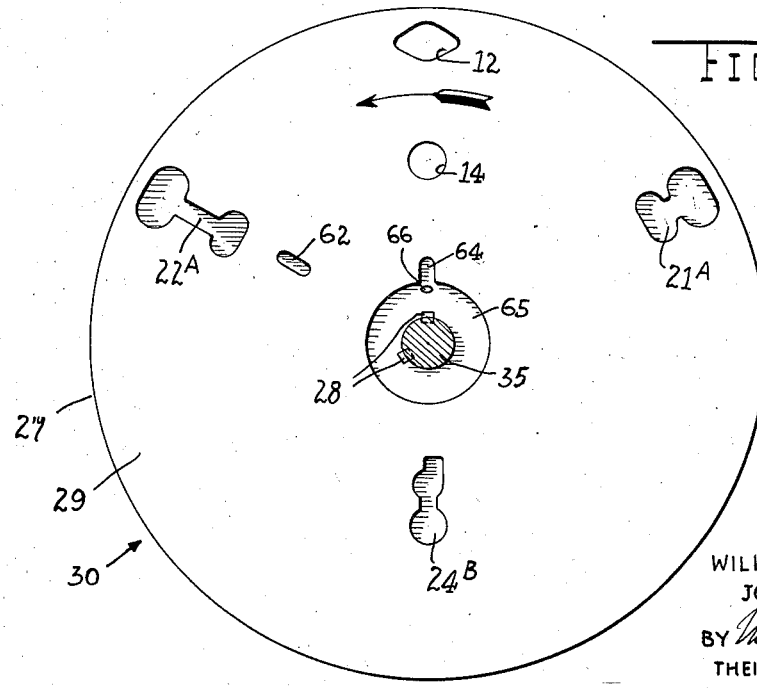

May 4, 1937. W. M. RYAN ET AL 2,079,041
FLUID DISTRIBUTION AND CONTROL
Filed Jan. 31, 1934 5 Sheets-Sheet 3
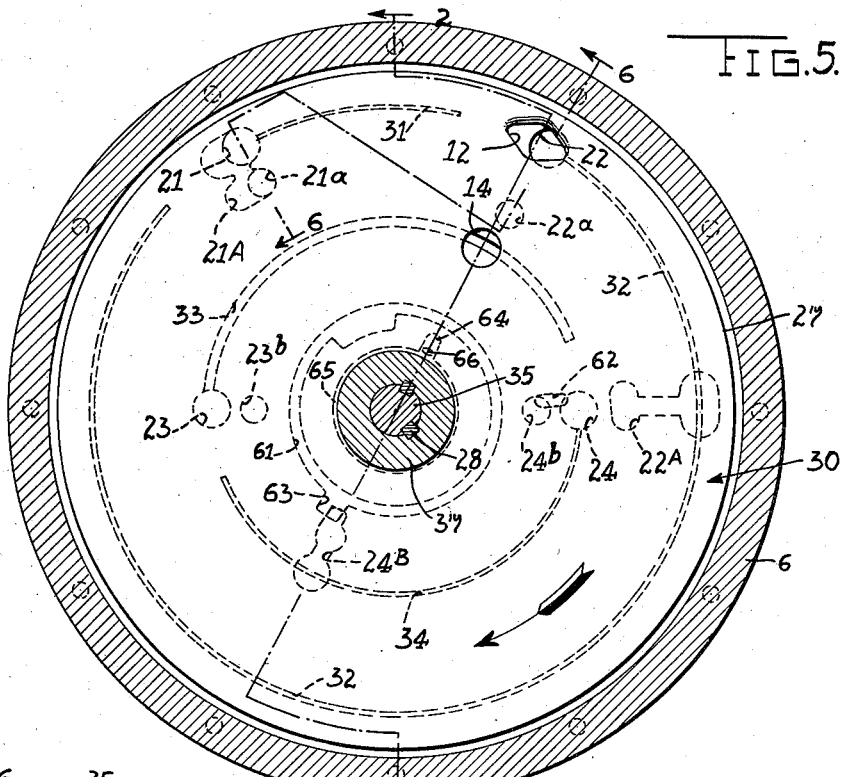
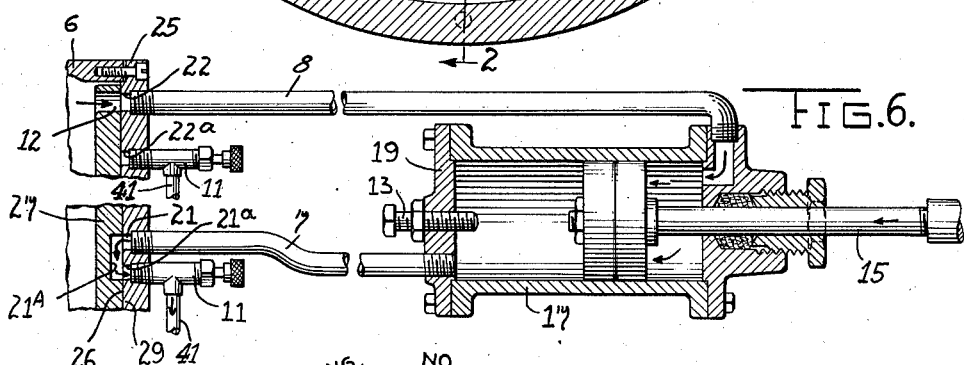
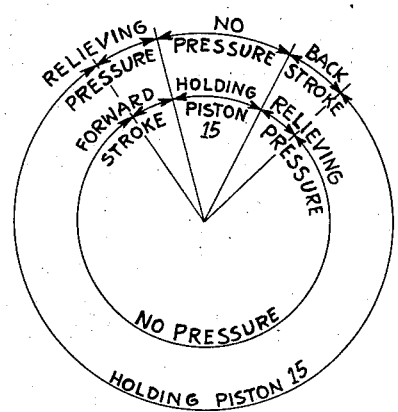
INVENTORS
WILLIAM MILES RYAN
JOHN W. BOLD
BY
THEIR ATTORNEYS INVENTORS
WILLIAM MILES RYAN
JOHN W. BOLD
BY *Usina & Rauber*
THEIR ATTORNEYS

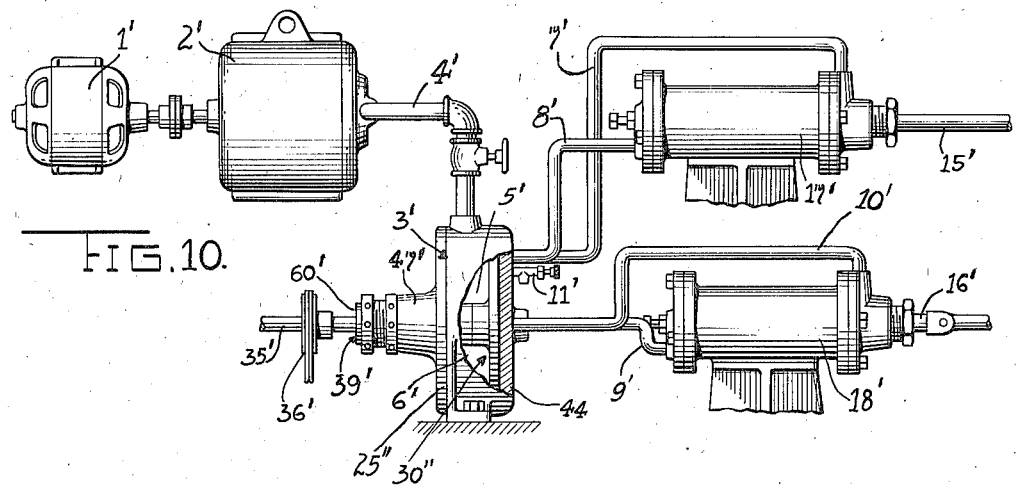
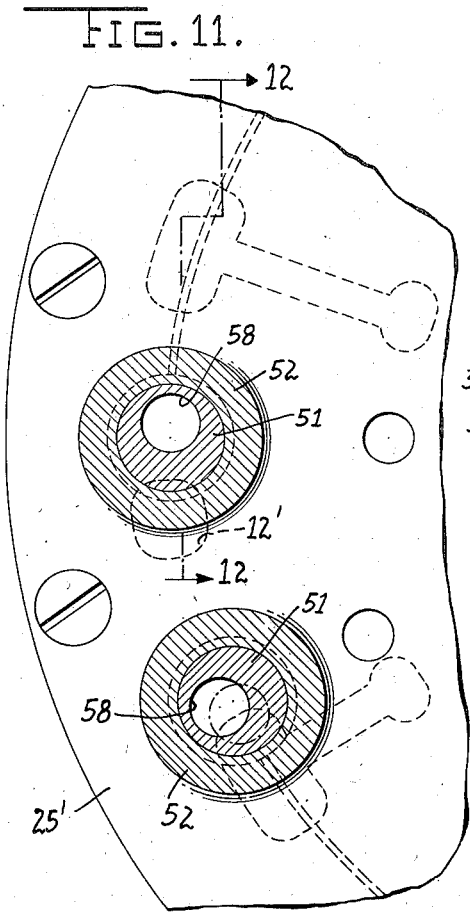
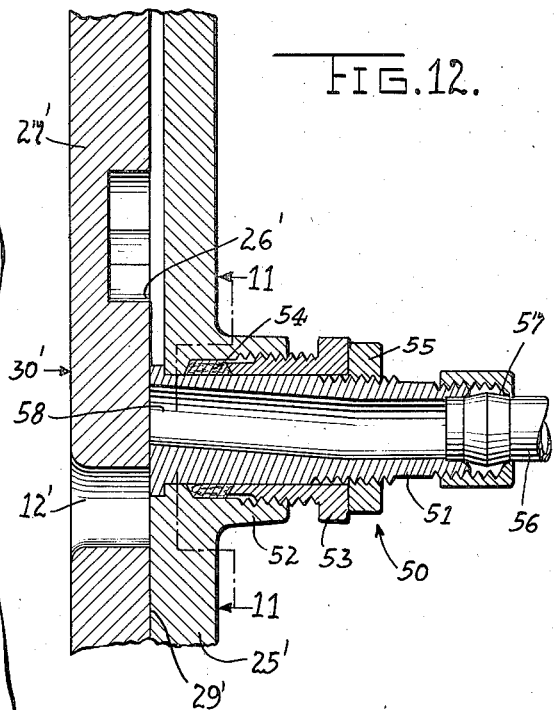

Patented May 4, 1937

2,079,041

UNITED STATES PATENT OFFICE 2,079,041

FLUID DISTRIBUTION AND CONTROL

William Miles Ryan and John W. Bold, Brooklyn, N. Y., assignors to Ryan Coffee Corporation, New York, N. Y., a corporation of New York Application January 31, 1934, Serial No. 709,198

4 Claims. (Cl. 121—147)

This invention relates to appliances for the distribution of power and its control of fluid-operated mechanisms and elements.

The present application is a continuation in part of our application Serial No. 655,733 filed February 8, 1933 for apparatus for sealing containers under vacuum or gas. In said application Serial No. 655,733 a method and an apparatus are described in which containers or cans to be sealed are supplied by fluid operating means to a sealing chamber maintained either under a vacuum or filled with a selected gas and the gates or valves through which the containers are supplied to and from the sealing chamber are also operated by fluid pressure elements. Movement of the containers and operation of the valves and gates by fluid pressure means has the advantage that the crushing of a container, in case it should become jammed in the apparatus, may be avoided by using a fluid pressure less than that required to crush the container. Moreover, operation of the various gates and valves may be rendered inoperative should a container prevent such a gate or valve from closing or opening by conditions imposing a greater resistance to opening under these conditions than the fluid pressure of the actuating means can overcome. Similar fluid pressure operated means may be used for other apparatus in which elements are to be moved by a yielding limited motive force.

Objects of our invention are to provide a fluid pressure driven motive means for moving articles, gates, valves, etc., and a timing and control mechanism whereby the fluid may be admitted to and exhausted from the several motive elements in timed sequence; and further, to provide such timing and control mechanism whereby the movement of fluid may be restricted or controlled so as to control or slacken the speed of movement of any selected element without otherwise changing the timing relation; to provide a means in such timing mechanism whereby the relative time of operation of said elements may be varied or adjusted.

Further objects of the invention are to provide a valve through which the supply and exhaust of fluid may be controlled to the various elements in timed sequence and whereby the supply of pressure fluid to said elements may be maintained for an extended interval; to provide a means whereby the movable element of the valve may be maintained on its seat by fluid pressure within its valve chamber and whereby said fluid pressure on said element will be maintained substantially constant for all positions of said element.

Other objects of this invention to be set forth and described hereinafter, will be specifically pointed out in the claims to follow.

The various features of the invention are illustrated in the accompanying drawings, in which—

Fig. 1 illustrates a side view of a control valve connected to a motor driven pump and two cylinders operated by air pressure.

Fig. 2 shows a sectional side view of the control valve enlarged, on line 2—2, Fig. 5.

Fig. 3 is a rear view of the cover plate of the valve on line 3—3, Fig. 2.

Fig. 4 is a front view of the rotor of the valve.

Fig. 5 is a sectional rear view of the coverplate and rotor on line 5—5, Fig. 2.

Fig. 6 is a sectional side view of an assembly of a cylinder and piston and parts of the coverplate and rotor, the latter parts shown in section on line 6—6, Fig. 5.

Fig. 7 is a diagram to demonstrate the pressure relation at the front and rear of a piston when operated by a valve.

Fig. 10 illustrates a side view similar to that shown in Fig. 1 with the difference that the cylinders are suction operated.

Figure 8:
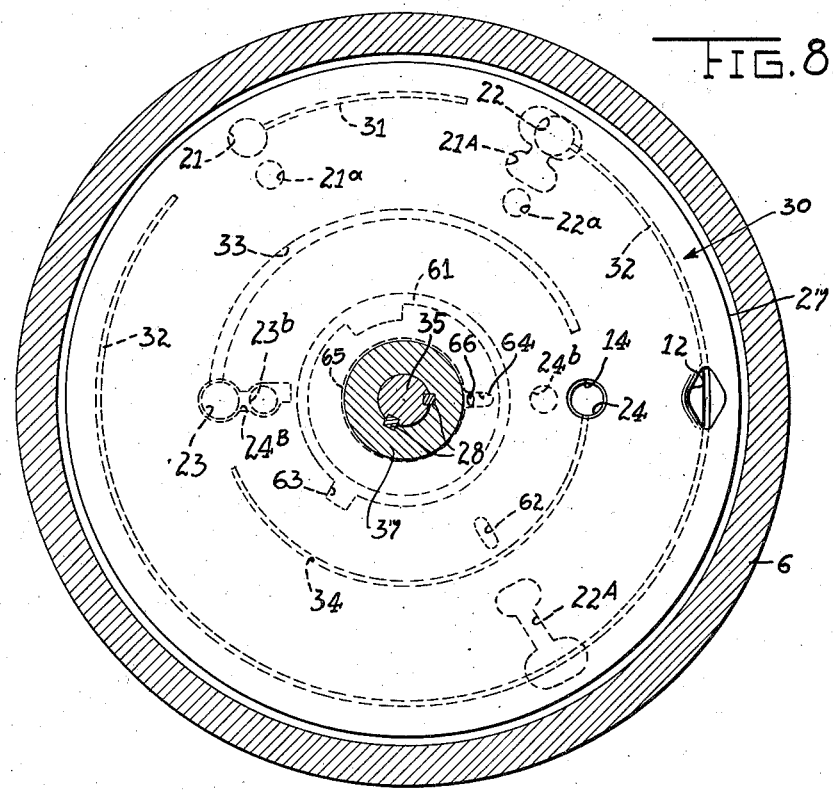
Figs. 8 and 9 are rear views of the cover plate and rotor identical to Fig. 5 with the rotor displaced relative to the coverplate.
Figure 9:
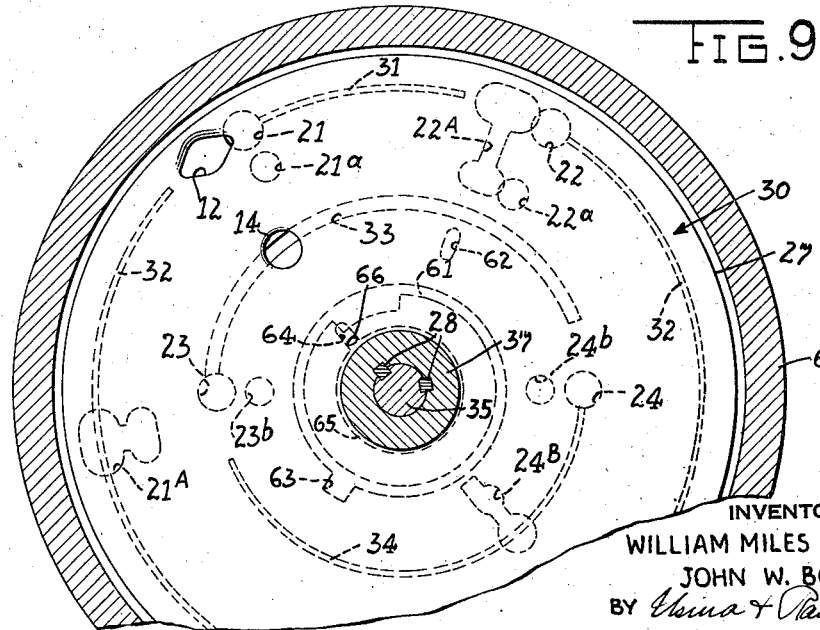

Figs. 11 and 12 show respective sectional front and side views of an eccentric pipe connector, held to a cover plate. The sectional front view of this connector in Fig. 11 is on line 11—11, Fig. 12 and the view in Fig. 12 is on line 12—12 of Fig. 11.

In the present invention the pressure fluid, either super-atmospheric or sub-atmospheric, is supplied from any suitable source of supply to a control mechanism from which it is admitted at suitably timed intervals to several motive elements.

In the specific form of the invention shown in the accompanying drawings, fluid under pressure is supplied by a pump 2 driven by a motor 1 through a pipe 4 to a control valve 3 from which it is distributed and exhausted alternatively to and from the pipes 7 or 8 leading to opposite ends of a cylinder 17 to drive a piston 15 in one direction or the other. Fluid pressure is also supplied to and exhausted from pipes 9 and 10 leading to opposite ends of a second cylinder 18 to drive a piston 16 therein alternatively in opposite directions.

It will be understood that the pistons and cylinders may be of different sizes or dimensions, or other equivalent forms of motive elements that require supplying and exhausting a pressure fluid may be employed.

Pipes 7 and 8 of cylinder 17 each have a regulating valve 20 for the purpose of controlling the flow of fluid and pressure therein. Pipes 9 and 10 of cylinder 18 as well as pipes 7, 8 are connected to a coverplate 25 recessed and fastened to the flat circular wall surface of housing 6 by means of screws or bolts as shown.

Pipes 7, 8 and 9, 10 lead into respective openings 21, 22 and 23, 24 of which each pair is arranged on an arc. The radius of one of these arcs is different from the other, Fig. 3.

The flat inner surface 26 of plate 25 is faced by a surface 29 of disc 27, which forms a rotor 30. This rotor is slidable on a driving shaft 35 and connected to same by means of keys 28.

Disc 27 is provided with two valve holes 12, 14 located the same distance from the centre of the disc as the respective ports 21, 22 and 23, 24. Whenever one of the holes 12, 14 pass over the related openings in coverplate 25, a connection is made between pressure chamber 5 and one side of the respective cylinders 17 and 18, thereby causing the pistons to operate.

Shaft 35, which rotates disc 27, is provided with a chain and sprocket 36 to connect with a suitable power transmission, not shown. Disc 27 has a tubular extension 37 with a thread 38 which screws into a sleeve 39. The threaded end of extension 37 abuts against a packing 45 located within sleeve 39, being provided for the purpose to prevent escape of air or liquid between the surfaces of shaft 35 and sleeve 39.

Another packing 46 located within a bearing neck 47 of housing 6 prevents the air from escaping at the outer surface of sleeve 39. Packing 46 is held tight within the bearing neck by means of a conventional threaded tubular screw 48 and nut 49.

In order to release the fluid from that part of the cylinder to which the piston is moved exhaust ports 21a, 22a and 23b, 24b are provided. These ports lead to the atmosphere and are located in radial alignment with the respective openings 21, 22 and 23, 24. A release of pressure fluid is brought about by means of a number of pockets or ducts, which are on the active surface 29 of rotor 30 and which may be brought to a position to connect the pipe openings severally to their respective exhaust ports.

Duct 21A is of sufficient length to span and connect port 21a and pipe opening 21 when brought to exhaust position. Duct 22A similarly spans and connects opening 22 to port 22a, duct 24B on a shorter radius of the rotor spans and connects in one radial position opening 23 and port 23b and in another position opening 24 and port 24b. Each one of the openings 21, 22, 23, 24 is connected with one respective circular-formed groove 31, 32, 33, 34 cut into the surface 26 of coverplate 25.

The reason for providing a difference in length of the ducts 21A, 22A may best be perceived when consulting Figs. 5, 6 and 7 in which the sequence of operations within a cycle is clearly demonstrated.

Piston 15 in cylinder 17 is shown to start moving in the direction towards the rear plate 19 of the cylinder, in that the valve hole 12 has started to pass over port 22 and thus connects the pressure chamber 5 with the cylinder. The movement of piston 15 towards plate 19 which may be referred to as the back stroke of the piston is variable in length by means of an adjustable stop in form of a screw 13.

The reason for making valve hole 12 diamond shaped, as shown, is to apply the area, for making pressure connections, in a gradual manner and thus produce a slow and uniform starting effect of the piston.

Figs. 5 to 7 demonstrate that, at the time piston 15 is ready to move, the pressure on the opposing side of the piston is being released, in that duct 21A provides an escape for the compressed air through exhaust port 21a into the atmosphere.

Exhaust ports 21a, 22a and 23b, 24b are preferably provided with valves 11, serving to let the air from the cylinders pass out within regulated periods of time.

The control through valves 11 permit the machine or other elements connected to and moved by the piston rod to travel at a certain rate of speed which may be brought into relation and synchronized with the movements of other machine elements. Valves 11 therefore comprise means for controlling the motions of machine elements and providing synchronization of same.

After piston 15 has reached stop screw 13, the pressure in the cylinder is being retained by means of groove 32 over which valve hole 12 passes while the disc is rotating. Duct 21A, which has released the pressure for the back stroke through 21, 21a will, during its travel, pass over opening 22. The length of this duct is insufficient to connect exhaust port 22a to opening 22, so that the pressure on piston 15 is held until duct 22A has reached opening 22 and exhaust port 22a. When duct 22A spans and connects these ports and has released the pressure in the cylinder 17 at the right of the piston, the valve port 12 is aligned with opening 21 admitting pressure fluid through pipe 7 to the left of the piston 15 and forces it on its forward stroke. After the piston has reached its destination a pressure is held against the same by means of groove 31.

The pressure retaining grooves 31, 32 enable a continuous pressure to be transmitted through the openings 21 and 22 to the piston so that it may be held against pressure or weights.

The cycle of operation for piston 16 is identical to the one previously described, the only difference being a change in timing within a cycle. The angular displacement of openings 23, 24 and their respective exhaust ports 23b, 24b is here shown to be 180°, so that whenever valve port 14 passes over one of these openings to cause a pressure on one side of the piston, duct 24B will pass over the other opening and its respective exhaust port, so as to release the compressed air on the opposite side of the piston. The angular displacement of 180° therefore enables a single duct to release the pressure fluid for both a back and forward stroke of the piston.

The relations in operating one cycle with another may be changed, if so desired, by an angular displacement of either one of the valve ports 12 or 14 or one of the two sets of openings and grooves in cover plate 25.

The operation of these pistons may be brought into relation with the movements of other mechanisms such as a lever 68 actuated by a cam 69 on valve shaft 35, Fig. 1.

While the openings and grooves in cover plate 25 will determine a sequence of a definite and fixed character within each cycle it may, nevertheless, be desirable on certain occasions to vary the same to a slight extent without however requiring the cover plate to be changed or made over again.

For this reason an eccentric pipe connector 50 may be introduced, Figs. 11 and 12. It comprises a shouldered sleeve 51 held airtight in a boss 52 on cover plate 25', by means of a tubular screw 53, pressing a stuffing or packing 54 against the sleeve and the inside of boss 52. A threaded nut 55 on sleeve 51 serves to lock the latter to plate 25'. Nut 55 seats itself against the head of screw 53 and provides a simple means for adjustment of the sleeve. Sleeve 51 is connected to a pipe 56 by means of a conventional coupling nipple 57. The opening 58 of sleeve 51 facing rotor 30' is disposed eccentrically, so that a rotation of the sleeve may either shorten or lengthen the relative distance between valve holes 12' and opening 58, thus changing the time relations within a cycle of operation. Sleeve 51 may be rotated during the time of operation, if so desired, by loosening nut 55 and applying a wrench on the neck of the sleeve.

In referring to Fig. 10, motor 1' drives a vacuum pump 2' which is connected to the control valve 3' by means of suitable piping 4'. Shaft 35' of the valve is rotated by a suitable transmission 36'. Valve 3' comprises a housing 6' to which is fastened a coverplate 25", which in this instance carries the bearing neck 41' for the support of sleeve 39' and shaft 35' connected to rotor 30". The latter touches with its contact surface the inner surface of the perpendicular housing wall 44. This wall connects with suitable piping 8', 7' and 9', 10' to respective cylinders 17' and 18' for correspondingly related back and forward strokes of pistons 15' and 16' in those cylinders.

The function of the rotor 30" for the control of the vacuum operated pistons is identical to the one previously described. Assuming that the cycles of operations of both pistons 15', 16' should be the same as those of pistons 15, 16 of Fig. 1, and that the pressure caused by suction would equal that applied in connection with pressure pump 2, the indentations as shown on the surfaces 26, 29 of respective Figs. 3 and 4 would remain the same, so that identical condition could prevail in control valve 3' of Fig. 10.

Since however a vacuum instead of an air or other fluid pressure is being applied in the valve chamber 5', disc 30" being subjected to a force of suction will tend to move away from the cover plate 25". The magnitude of this force is dependent on the degree of area exposures to atmospheric pressure of the surfaces of disc 30" and plate 25", as well as surface 60' of sleeve 39'. In order to retain a pressure on the rotor disc it will therefore be quite evident that the area A of surface 60' must always be larger than the sum of areas S of the currently exposed areas of the various openings, grooves and pockets in the respective cover-plate and rotor disc of the valve.

The difference therefore between a valve in which its rotor is under a pump pressure in one instance and under a force of suction in another, exists in making area A in relation to areas S smaller under pressure conditions and larger under a state of vacuum respectively.

The distributor thus shown and described will therefore not alone comprise a simple and efficient device for the operation of various mechanisms and contrivances, but it will also afford an effective control over these mechanisms during their operation. This invention also discloses a simple method of retaining a comparatively small pressure on the rotor and of keeping the pressure at a practically uniform degree.

It will be obvious that in the design of a power distributor, as shown and described, more than two sets of openings and grooves on one circle may be applied if so desired. The eccentric pipe connector of Fig. 12 may also be used if so desired in connection with release valves 11, thereby providing a possibility to regulate and time the sequence of release within a cycle as well as regulate the sequence of operations of related cycles. It is understood that such changes and alterations may be made as fall within the scope of this invention.

Having disclosed and fully described our invention what we claim by Letters Patent is:

1. A rotary control valve for operating mechanisms independently in inter-related cycles which comprises a valve chamber having exhaust outlets in one wall and having fluid supply outlets at different radial distances from a central point, and a rotary valve disc having fluid supply ports at radial distances from its axis of rotation to correspond with said supply outlets and having exhaust passages spaced at radial distances from its axis of rotation to connect said respective fluid supply outlets to an exhaust outlet.

2. The valve of claim 1 in which the several fluid supply outlets extend through overlapping arcs.

3. A fluid distributor comprising a housing having a fluid passage and exhaust ports, a rotor in said housing having passages to open said fluid passage ports in predetermined cycles to the interior of said housing and to said exhaust ports, and means to vary the relative positions of said ports, said varying means comprising rotatable cylinders, one for each port, mounted eccentrically of the axis of said rotor and having a port extending therethrough to the interior of said housing and mounted eccentrically in said cylinder.

4. A rotary control valve for operating mechanisms independently in inter-related cycles which comprises a valve chamber having exhaust outlets and having fluid supply outlets in one wall at different radial distances from a central point, and a rotary valve disc having fluid supply ports at radial distances from its axis of rotation to correspond with said supply outlets, and having exhaust passages spaced at radial distances from its axis of rotation to connect said respective fluid supply outlets to an exhaust outlet, said valve disc having passages communicating with said exhaust outlet to provide equal areas in communication with said exhaust outlet for each equal radial sector of said disc.

WILLIAM MILES RYAN.
JOHN W. BOLD.